(12) United States Patent
Arnold et al.

(10) Patent No.: US 12,516,670 B2
(45) Date of Patent: Jan. 6, 2026

(54) MULTISTAGE RADIAL COMPRESSOR BAFFLE

(71) Applicant: Garrett Transportation I Inc., Torrance, CA (US)

(72) Inventors: Philippe Arnold, Thaon-les-Vosges (FR); Michael Ladonnet, Thaon-les-Vosges (FR); David Francois, Thaon-les-Vosges (FR); Nathaniel Bontemps, Thaon-les-Vosges (FR)

(73) Assignee: Garrett Transportation I Inc., Torrance, CA (US)

( * ) Notice: Subject to any disclaimer, the term of this patent is extended or adjusted under 35 U.S.C. 154(b) by 310 days.

(21) Appl. No.: 17/546,666

(22) Filed: Dec. 9, 2021

(65) Prior Publication Data

US 2023/0184254 A1    Jun. 15, 2023

(51) Int. Cl.
| | | |
|---|---|---|
| F04C 29/00 | (2006.01) |
| B22F 5/00 | (2006.01) |
| F01D 9/00 | (2006.01) |
| F01D 9/02 | (2006.01) |
| F01D 17/12 | (2006.01) |
| F01D 17/16 | (2006.01) |
| F01D 25/24 | (2006.01) |
| F01D 25/28 | (2006.01) |
| F04D 17/12 | (2006.01) |

(52) U.S. Cl.
CPC .............. *F04D 17/12* (2013.01); *B22F 5/009* (2013.01); *F01D 17/16* (2013.01)

(58) Field of Classification Search
CPC . F01D 9/02; F01D 9/00; F01D 917/16; F01D 25/24; F01D 25/28; F01D 5/043; F01D 5/141; F04D 17/125; B22F 5/125
See application file for complete search history.

(56) References Cited

U.S. PATENT DOCUMENTS

| | | | |
|---|---|---|---|
| 1,037,243 A | 9/1912 | Guy | |
| 4,032,262 A | 6/1977 | Zehnder | |
| 4,155,684 A | 5/1979 | Curiel et al. | |
| 5,087,172 A * | 2/1992 | Ferri | F04D 17/125 277/374 |
| 6,062,028 A | 5/2000 | Arnold | |
| 7,407,364 B2 | 8/2008 | Arnold et al. | |
| 9,856,886 B2 * | 1/2018 | Kares | F04D 17/122 |
| 10,801,513 B2 * | 10/2020 | Clay | F04D 29/102 |
| 2007/0122296 A1 | 5/2007 | Arnold et al. | |

(Continued)

OTHER PUBLICATIONS

Teimourian et al., entitled "Vortex Shedding Suppression: A Review on Modified Bluff Bodies", Eng 2021, 2, 325-339, Jul. 27, 2021 (15 pages).

(Continued)

*Primary Examiner* — Deming Wan
(74) *Attorney, Agent, or Firm* — BelayIP

(57) ABSTRACT

An assembly can include a first radial compressor wheel that has a rotational axis and that includes a hub surface; a second radial compressor wheel that comprises a hub surface; and an annular baffle disposed at least in part between the hub surfaces wherein the annular baffle an outer edge and a substantially parabolic portion that extends to a tip portion, where the tip portion includes opposing sides that converge radially inwardly to a blunt end.

19 Claims, 11 Drawing Sheets

(56) References Cited

U.S. PATENT DOCUMENTS

| | | | |
|---|---|---|---|
| 2015/0300366 A1* | 10/2015 | Freeman | F04D 17/125 |
| | | | 415/203 |
| 2016/0195100 A1 | 7/2016 | Alban et al. | |
| 2018/0119708 A1* | 5/2018 | Kares | F04D 29/422 |
| 2018/0283385 A1* | 10/2018 | Mizunoue | F04D 29/083 |
| 2018/0306203 A1 | 10/2018 | Nasir et al. | |
| 2021/0285461 A1* | 9/2021 | Hilgenberg | F04D 29/056 |

OTHER PUBLICATIONS

EP Appl. No. 22 18 8579, EPO Extended Examination Report of Apr. 26, 2023 (6 pages).

* cited by examiner

Table 1100

| Parameters / Variables | Fig. 10 | Fig. 3 |
|---|---|---|
| Shaft Speed (1/min) | 118922 | 118922 |
| Low Pressure (in) Temperature (C) | 298 | 298 |
| Low Pressure (out) Pressure (bar) | 2.06 | 2.06 |
| Low Pressure Efficiency (%) | 64.88 | 64.96* |
| Leakage (g/s) | 3.6 | 3.3* |

*Improved

Fig. 11

MULTISTAGE RADIAL COMPRESSOR BAFFLE

TECHNICAL FIELD

Subject matter disclosed herein relates generally to multistage radial compressors.

BACKGROUND

Compressors are frequently utilized to increase output of an internal combustion engine. A turbocharger can include a compressor, which may be a multistage radial compressor. As an example, such a compressor may be driven by a turbine wheel operatively coupled to a shaft that can rotatably drive the compressor or, for example, such a compressor may be driven by another mechanism such as, for example, an electric motor. Various examples of techniques, technologies, etc. described herein pertain to multistage radial compressors.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where:

FIG. 11 is an example of a table that includes information as to two baffles.

DETAILED DESCRIPTION

Figure 1:
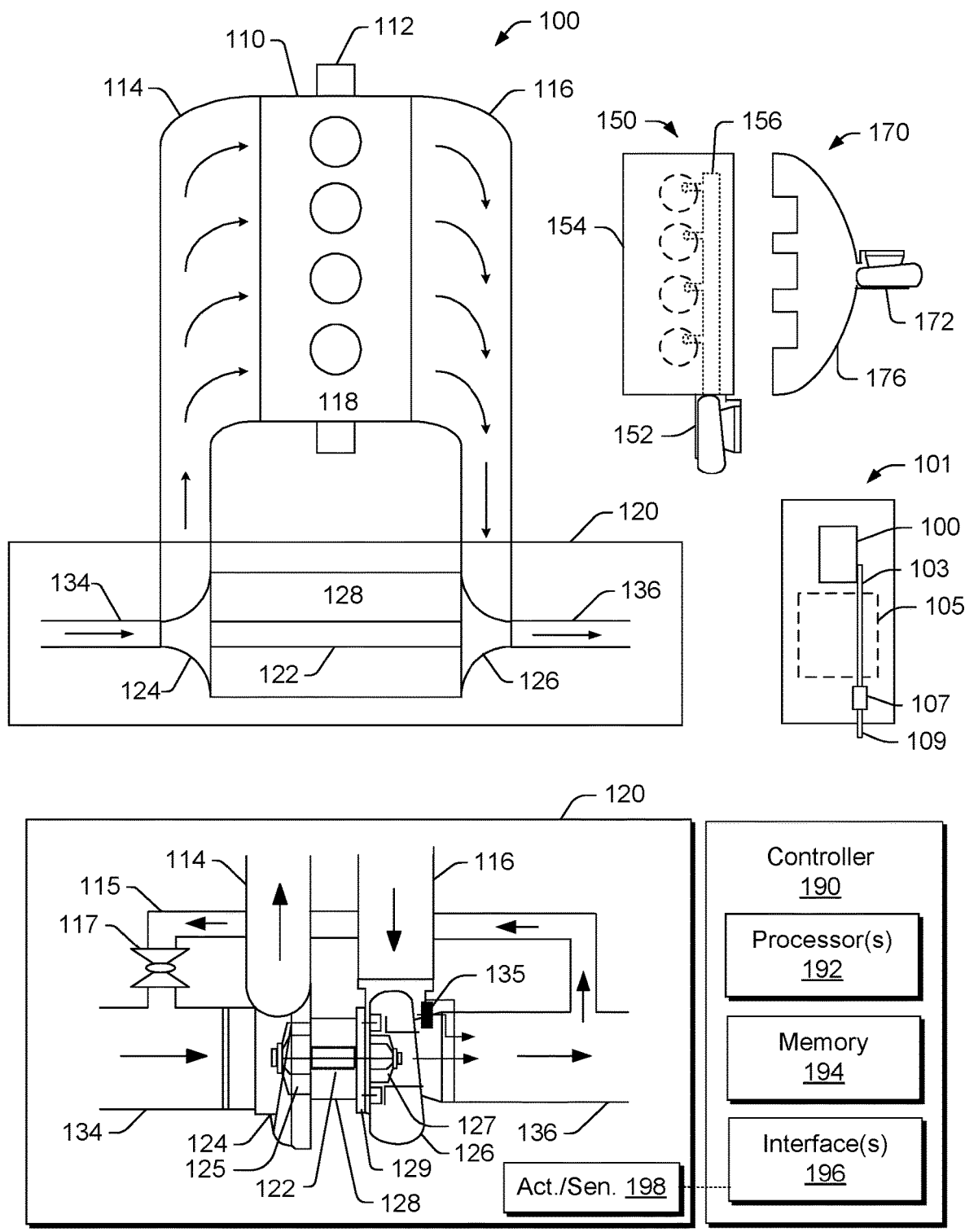
FIG. 1 is a diagram of an example of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
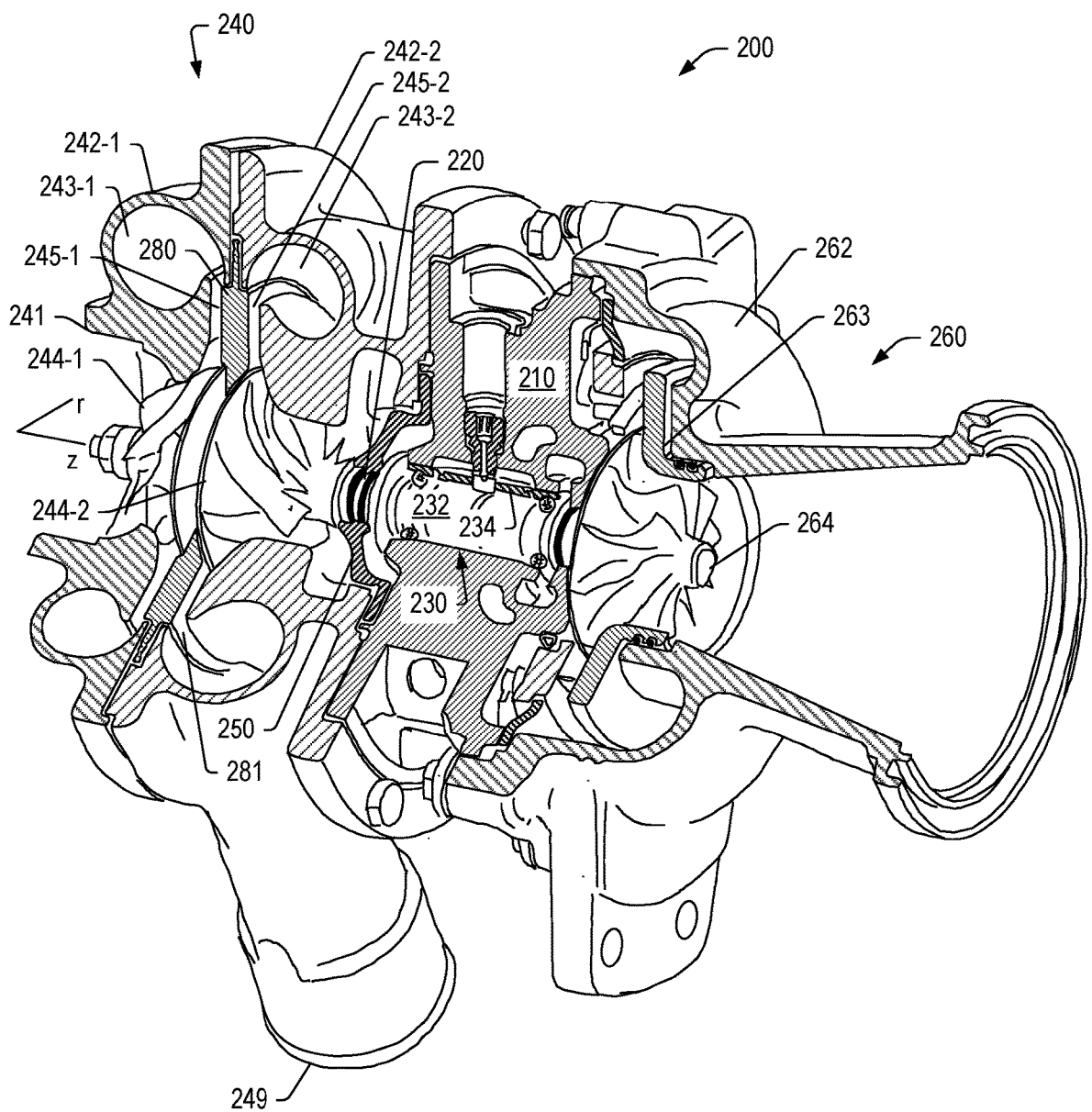
FIG. 2 is a cut-away view of an example of a turbocharger.

FIG. 2 shows an example of a turbocharger assembly 200 that includes a bearing housing 210 that supports a bearing assembly 230 in a through bore of the bearing housing 210 where the bearing assembly 230 may be or include a rolling element bearing assembly. For example, the bearing assembly 230 may be a bearing cartridge that includes an inner race 232 and an outer race 234 where rolling elements are disposed between an the inner race 232 and the outer race 234 and where a shaft 220 is operatively coupled to the inner race 232 such that rotation of the shaft 220 rotates the inner race 232. In such an example, the outer race 234 may be located with respect to the bearing housing 210 (e.g., via a locating mechanism, etc.). As an example, seal elements may be disposed about the shaft 220 (e.g., or a collar), for example, to reduce flow of air and/or exhaust to the bearing assembly 230. Such seal elements may also act to reduce flow of lubricant (e.g., in an opposite direction).

In the example of FIG. 2, the turbocharger assembly 200 includes a compressor assembly 240 that includes an inlet 241 that may be formed as part of a first compressor housing component 242-1 that can be operatively coupled to a second compressor housing component 242-2. As shown, the first compressor housing component 242-1 may define, at least in part, a first volute 243-1 and the second compressor housing component 242-2 may define, at least in part, a second volute 243-2. In the example of FIG. 2, a first compressor wheel 244-1 can direct gas (e.g., air, an air and exhaust mixture, etc.) to a first diffuser section 245-1 to the first volute 243-1 and the second compressor wheel can direct air to a second diffuser section 245-2 to the second volute 243-2. For example, the compressor wheels 244-1 and 244-2 may each include a respective inducer portion and a respective exducer portion where gas flows into the inducer portion and out of the exducer portion (e.g., to a respective diffuser section). As shown in the example of FIG. 2, the compressor wheels 244-1 and 244-2 are radial compressor wheels. As an example, a radial compressor may achieve a pressure rise by adding kinetic energy (e.g., velocity) to a flow of fluid (e.g., air, etc.) through a rotor (e.g., impeller or "wheel"). As an example, such kinetic energy may be converted to an increase in potential energy (e.g., static pressure), for example, by slowing the flow through a diffuser section.

In the example of FIG. 2, the turbocharger assembly 200 includes a turbine assembly 260 that includes a turbine housing component 262, an insert component 263, and a turbine wheel 264. As an example, the turbine assembly 260 may include a nozzle adjustment mechanism such as a variable geometry mechanism that can adjust positions of vanes, etc. that may define throats that direct exhaust gas to the turbine wheel 264. As an example, the turbine wheel 264 may be operatively coupled to the shaft 220. As an example, the turbine wheel 264 and the shaft may be a shaft and wheel assembly (SWA). In the example of FIG. 2, exhaust gas may flow to the turbine wheel 264 to cause the turbine wheel 264 to rotate and thereby rotate the shaft 220. In the example of FIG. 2, the first compressor wheel 244-1 and the second compressor wheel 244-2 are operatively coupled to the shaft 220 (e.g., via the shaft 220 being disposed in a through bore of the compressor wheels 244-1 and 244-2 and fitted with a nut or other mechanism at an nose end of the compressor wheel 244-1, via a partial bore or "boreless" dual-faced compressor wheel assembly, etc.). Thus, energy may be extracted from exhaust gas to cause rotation of the shaft 220 and rotation of the first compressor wheel 244-1 and the second compressor wheel 244-2. In such an example, gas (e.g., air, an air exhaust mixture, etc.) flowing into the compressor assembly 240 may be compressed and exit the compressor assembly 240 at an outlet 249, which may be, for example, a portion of the second compressor housing component 242-2.

While the example of FIG. 2 shows the turbine assembly 260 as a mechanism that can rotate the compressor wheels 244-1 and 244-2, compressor wheels of a compressor assembly such as the compressor assembly 240 of FIG. 2 may be driven by a different type of mechanism, additionally or alternatively. For example, an electric motor may be operatively coupled to a shaft to which the first compressor wheel 244-1 and the second compressor wheel 244-2 are operatively coupled. In such an example, electrical power may be supplied to the electric motor to rotatably drive the shaft and hence the compressor wheels 244-1 and 244-2. In such an example, a bearing housing may be implemented, optionally as part of an electric motor assembly (e.g., consider a motor housing that houses a stator and a rotor coupled to a shaft where the motor housing includes one or more bearings, bearing assemblies, etc. to rotatably support the shaft).

In the example of FIG. 2, a baffle 280 exists that includes an outer surface 281 where a portion of the outer surface 281 defines in part the first diffuser section 245-1 and where another portion of the outer surface 281 defines in part the second diffuser section 245-2. As an example, the first compressor wheel 244-1, the first diffuser section 245-1 and the first volute 243-1 may operate at a lower pressure than the second compressor wheel 244-2, the second diffuser section 245-2 and the second volute 243-2. In such an example, gas (e.g., air, an air exhaust mixture, etc.) may flow into the compressor assembly 240 via the inlet 241, be compressed by the first compressor wheel 244-1 and then flow to the second compressor wheel 244-2 where it is further compressed and directed to the outlet 249. In such an example, the compressor assembly 240 may be referred to as a two stage compressor assembly with a first, low pressure stage and a second, high pressure stage.

In such a two stage arrangement, during operation, gas pressure in the first diffuser section 245-1 may be expected to be less than gas pressure in the second diffuser section 245-2. In such an example, gas may flow from the second diffuser section 245-2 to the first diffuser section 245-1. Such flow may decrease efficiency of operation of the compressor assembly 240. As another example, such flow may act to increase the temperature of gas flowing in the first diffuser section 245-1, which, in turn, may act to increase the temperature of gas flowing to the inducer portion of the second compressor wheel 244-2 and thereby diminish the overall effect of the second stage.

In a compressor assembly such as the compressor assembly 240, it is desirable to isolate the work of the first compressor wheel 244-1 as gas flows from the inducer portion to the exducer portion and into the first diffuser section 245-1 and to isolate the work of the second compressor wheel 244-2 as gas flows from the inducer portion to the exducer portion and into the second diffuser section 245-2. However, the baffle 280 may, with respect to hub portions of the compressor wheels 244-1 and 244-2, define a somewhat annular, V-shaped passage where gas may flow from a higher pressure region to a lower pressure region. Specifically, during operation of a two stage compressor assembly, gas may flow from a region of the high pressure stage to a region of the low pressure stage via such a passage. For example, consider a portion of the gas compressed by the second compressor wheel 244-2 flowing to a region adjacent the hub portion of the first compressor wheel 244-1. In such an example, that portion of the gas does not directly enter the second diffuser section 245-2. Such a phenomenon may be referred to as "interstage leakage". As an example, interstage leakage may decrease overall compressor stage efficiency.

As an example, the outer surface 281 of the baffle 280 may include a shape or shapes that act to reduce interstage leakage. As an example, the hub portion of at least one of the compressor wheels 244-1 and 244-2 may include a shape or shapes that act to reduce interstage leakage. As an example, a baffle and a hub portion or hub portions may include shapes that act to reduce interstage leakage.

Figure 3:
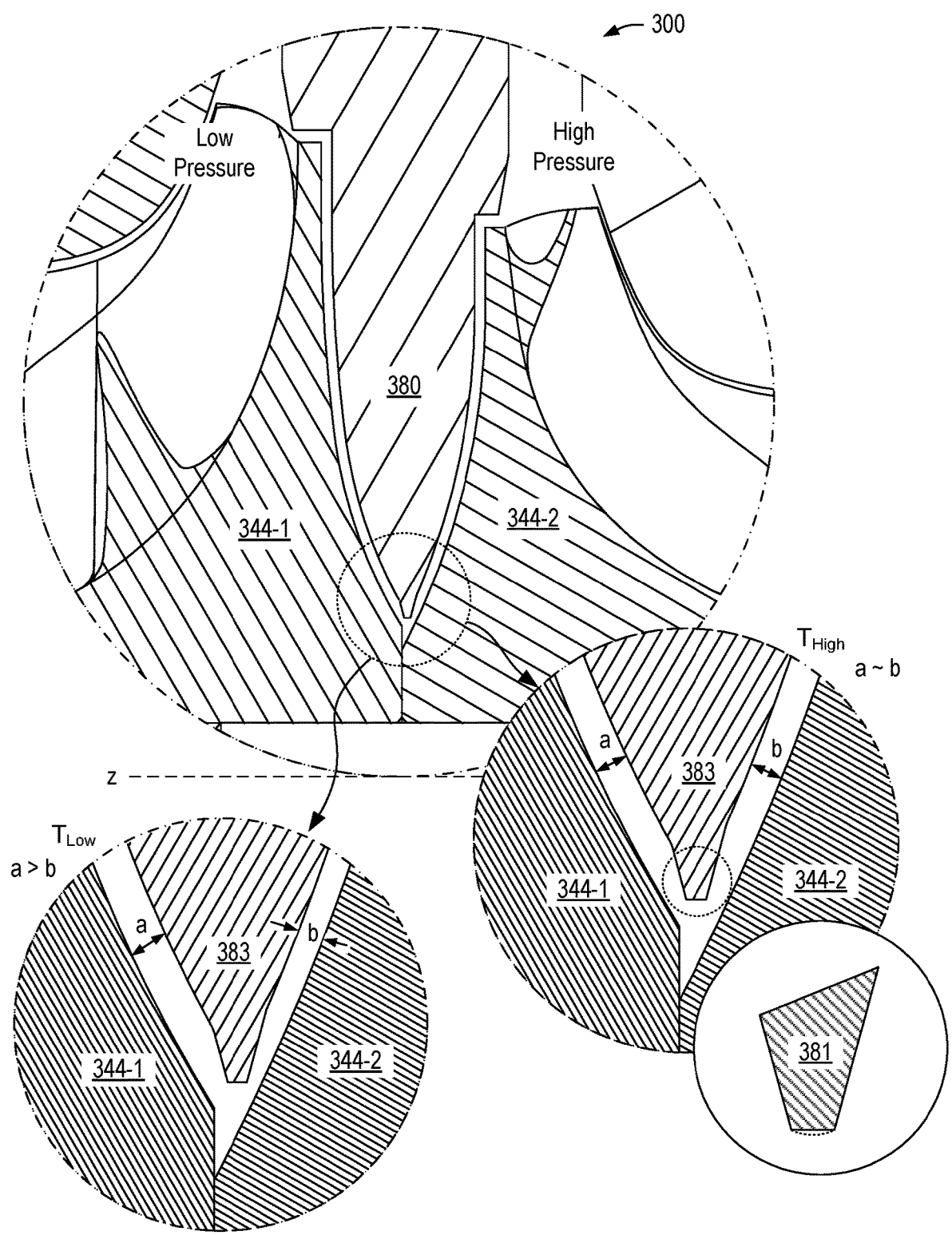
FIG. 3 is a cross-sectional view of an example of a portion of an assembly that includes an example of a baffle.

FIG. 3 shows an example of a portion of a compressor assembly 300 that includes a first compressor wheel 344-1, a second compressor wheel 344-2 and a baffle 380 that is disposed at least in part partially between a hub portion of the first compressor wheel 344-1 and a hub portion of the second compressor wheel 344-2. In the example of FIG. 3, the second compressor wheel 344-2 may be considered a high pressure stage compressor wheel while the first compressor wheel 344-1 may be considered a low pressure stage compressor wheel.

As shown in the example of FIG. 3, a passage is defined where the passage can be defined by the wheels 344-1 and 344-2 and the baffle 380. As shown, the wheels 344-1 and 344-2 can include different base diameters such that an offset exists. For example, the wheel 344-2 can include a smaller base diameter than the wheel 344-1 such that an annulus is formed with a cross-section that may be approximately by a triangle.

As shown in the example of FIG. 3, the baffle 380 can include opposing sides where each of the sides can be shaped in a complementary manner with respect to a respective wheel shape. For example, the low pressure side of the baffle 380 has a shape over at least a portion of the low pressure side that is complementary to the shape of a backdisk portion of the low pressure wheel 344-1 and the high pressure side of the baffle 380 has a shape over at least a portion of the high pressure side that is complementary to the shape of a backdisk portion of the high pressure wheel 344-2. In the example of FIG. 3, the backdisk portions of the wheels 344-1 and 344-2 are generally concave while the opposing sides of the baffle 380 are generally convex. As explained below, a tip portion 381 of the baffle 380 can be shaped appropriately where, for example, a change in concavity may be present on one or both sides of the baffle 380 at or near the tip portion 381.

A change in concavity may be indicated by an inflection point. An inflection point is a point on a curve at which the sign of the curvature (i.e., the concavity) changes. Inflection points may be stationary points, but are not local maxima or local minima. For example, for the curve $y=x^3$, the point $x=0$ is an inflection point. A necessary condition for a point x to be an inflection point is that the second derivative of a function with respect to x is equal to zero at the point x. As an example, a baffle can have opposing sides where one or both of the opposing sides has an inflection point that can be in a transition region between a curved portion and a tip portion (e.g., before a tip end point, etc.).

As an example, baffle may be defined using one or more mathematical terms. As an example, a parametric curve may be utilized to define at least a portion of a baffle profile. A parametric curve can be defined in part by continuity in terms of differentiability. For example, $C^0$ continuity means that a curve is connected at joints, $C^1$ continuity means that a curve is connected as segments that share a common first derivative at a joint, and $C^n$ continuity means that segments share the same nth derivative at a joint. As an example, a baffle profile may be represented by a parametric curve that has $C^0$ continuity and/or greater than $C^0$ continuity. For example, $C^0$ continuity may exist at a transition between a substantially parabolic portion and a tip portion of a baffle. A transition region may include a transition point, which may be a joint where two segments meet and where continuity may be defined (e.g., as being at least $C^0$ continuity).

As an example, a baffle profile may be represented by one or more parametric polynomial curves. As an example, one or more splines may be utilized to define a baffle profile and/or one or more blending functions may be utilized to define a baffle profile. As to splines, some examples include Hermite, Bezier, Catmull-Rom and B-Spline. As an example, a baffle profile may be represented using control points, which may be joints. For example, a baffle profile may be represented using control points in a r,z-plane to define a number of segments where the segments can have at least $C^0$ continuity at the control points (e.g., joints). In such an example, one or more splines may be utilized to define a baffle profile. As an example, a wheel backdisk profile may be defined using one or more splines, one or more types of continuity, etc. As explained, a baffle may include at least a portion of a profile that is complementary to at least a portion of a profile of a wheel backdisk.

As shown, clearances may be defined to include, for example, a low pressure side passage clearance and a high pressure side passage clearance. In the example of FIG. 3, a clearance "a" and a clearance "b" are shown at two different temperatures, $T_{Low}$ and $T_{High}$, where $T_{Low}$ may be an ambient temperature and $T_{High}$ may be an operational temperature. As shown, at $T_{Low}$, a>b, and at $T_{High}$, a~b. Such differences can be due to thermal environment and thermal expansion and contraction of components. For example, a baffle may be shaped in a manner that accounts for thermal properties of components such that a spatial relationship of the baffle to back-to-back wheels is suitable over a range of temperatures where the spatial relationship is at or near optimal over a range of operational temperatures (e.g., greater than ambient temperature). Operational temperatures of a compressor assembly can be in excess of approximately 50 degrees C. and can depend on exhaust temperature, cooling and/or lubrication fluid(s), ambient air temperature, etc. As shown in the example of FIG. 3, the baffle 380 may become more centered with respect to the wheels 344-1 and 344-2 as temperature increases from ambient to operational (e.g., centered with respect to an interface defined by the two wheels 344-1 and 344-2). For example, at ambient temperature, the baffle 380 may be offset toward the high pressure wheel 344-2 and be more centered at higher temperatures. In the example of FIG. 3, as the high pressure wheel 344-2 has a smaller maximum diameter (e.g., outer diameter or perimeter), the tip portion 381 appears as being offset towards the high pressure wheel 344-2.

As shown in the example of FIG. 3, the baffle 380 can include the tip portion 381 that can define an annular portion of the baffle 380 where the tip portion 381 may be defined in part as an annular portion with a cross-section that may be approximated by a truncated triangle. For example, consider a triangle with a base defined between two vertices and sides that extend from the vertices to truncation points such that the third vertex of the triangle is absent. As an example, such a truncated triangular shape may be defined by two internal angles, as defined between the base and each of the sides. In such an example, the sides are not parallel but are antiparallel such that they may converge. In such an example, the internal angles may be the same or they may differ.

As an example, a truncated triangular shape may be a tetragon or quadrilateral. For example, consider a quadrilateral with a base at a radial distance from an axis of rotation of two compressor wheels and opposing sides that converge to an end at a greater radial distance from the axis of rotation of the two compressor wheels. As an example, a quadrilateral can be convex, for example, consider a convex hull. As an example, a quadrilateral can be a trapezoid where a base and an end may be parallel or not parallel while opposing sides converge from the base to the end.

In the example of FIG. 3, the tip portion 381 is shown as being defined, in cross-section by a quadrilateral where at least some of the internal angles differ. In such an example, two of the internal angles may be approximately the same. For example, the internal angles between the sides and the end may be approximately the same and greater than approximately 90 degrees. In the example of FIG. 3, the tip portion 381 is shown as including one internal angle that is less than 90 degrees, which corresponds to an internal angle between a longer of the opposing sides and the base. In such an example, another internal angle between a shorter of the opposing sides and the base is greater than 90 degrees.

In the example of FIG. 3, the tip portion 381 of the baffle 380 can extend radially outwardly from a curved portion 383. For example, consider a curved portion that may be defined using one or more curves, which may be defined using one or more types of equations. For example, consider a parabolic equation such that the baffle 380 includes a parabolic shape or shapes (e.g., complementary to a shape or shapes of a backdisk portion or backdisk portions, etc.).

As an example, a baffle may include a transition region between a curved portion and a tip portion. For example, the baffle 380 may include a transition region between the curved portion 383 and the tip portion 381 that may be defined using one or more types of curves. As an example, a machining process may be utilized to form the baffle 380 or a portion thereof. For example, consider machining the tip portion 381 and a transition region between the tip portion 381 and the curved portion 383 where the transition region may aim to reduce stress, reduce flow disturbance, etc. For example, the transition region may be aerodynamically shaped to smooth the transition from the curved portion 383 to the tip portion 381.

As an example, an annular baffle for a two stage radial compressor assembly can include an outer edge (e.g., an outer end); and a substantially parabolic portion that includes an inner edge that defines an opening having a central axis and opposing surfaces that extend from the inner edge. In such an example, the opposing surfaces may converge from the parabolic portion (e.g., a curved portion) to a tip portion, which may include a blunt end. As mentioned, a blunt end, in cross-section, may be defined using a truncated triangle, a quadrilateral, etc.

Figure 5:
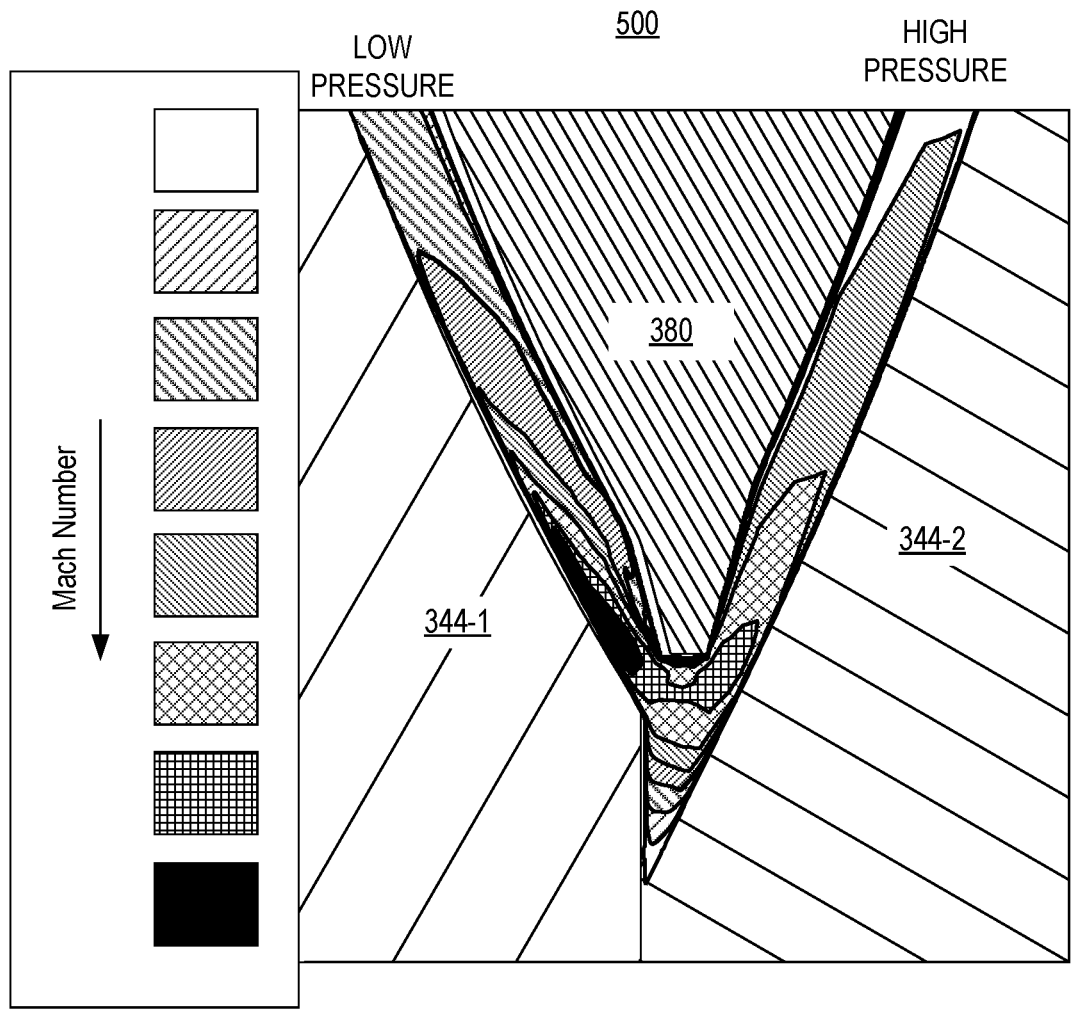
FIG. 5 is an example plot of results of Mach number for flow in a passage.

As an example, a tip portion can include an end that is shaped to promote vortex formation (see, e.g., FIG. 5). Such a vortex can provide for flow at an elevated Mach number. The Mach number is a dimensionless quantity in fluid dynamics representing the ratio of flow velocity past a boundary to the local speed of sound. Such a vortex (e.g., an eddy) can be offset toward a low pressure side where flow is in a direction from a high pressure side to the low pressure side. Such a vortex can help to reduce flow from the high pressure side to the low pressure side. In 3D, such a vortex may be toroidal and/or may be a number of individual vortices arranged in a substantially toroidal manner. As shown in the example of FIG. 3, the tip portion 381 can include an end with a flat profile that extends from one corner to another corner. As an example, the end may be curved, for example, consider a slight curve (see, e.g., dotted line), which may be between two corners (e.g., sharp and/or radiused). As to a slight curve, it may be defined using a circle where a diameter of the circle is equal to or less a corner to corner distance (e.g., equal to or less than a hemisphere). As an example, a sharp corner on a downstream side (e.g., low pressure side) may help to promote vortex formation. As an example, a slight amount of smoothing of a corner may reduce risk of cutting or other damage upon contact. As an example, a tip portion can be shaped to promote vortex formation with an elevated Mach number, which may be a maximum Mach number in a clearance formed between backdisk portions of compressor wheels and an annular baffle.

As an example, a tip portion can be a vortex forming feature of an annular baffle. As an example, a tip portion can act as a bluff body within a flow field where one or more vortices are formed by flow past the bluff body. An article by Teimourian et al., entitled "Vortex Shedding Suppression: A Review on Modified Bluff Bodies", Eng 2021, 2, 325-339, 27 Jul. 2021, is incorporated by reference herein. The article by Teimourian et al., pertains to vortex shedding suppression through geometry modification on a bluff body. In the example of FIG. 3, the baffle 380, particularly the tip portion 381, can be a bluff body with a geometry that can deliberately promote vortex formation.

Vortex formation can depend on various conditions. The local speed of sound, and hence the Mach number, depends on the temperature of a surrounding gas. The Mach number may be utilized to determine whether flow can be treated as an incompressible flow or as compressible flow. A boundary can be stationary (e.g., static) while gas flows along it. A boundary can be that of an object immersed in a gas or can be that of a channel (e.g., a baffle) that channels the gas. As the Mach number is defined as the ratio of two speeds, it is a dimensionless number. If the Mach number is less than 0.2-0.3 and the flow is quasi-steady and isothermal, compressibility effects may be small and simplified incompressible flow equations may be used. As an example, in compressor operations, Mach number can be in excess of 1.0. For example, in FIG. 5, a vortex may be formed with a Mach number that may be greater than 1.0 (e.g., depending on conditions, etc.). In such an example, one or more other regions may have flow less than a Mach number of 1.0 (e.g., depending on conditions, etc.).

In the example of FIG. 3, the baffle 380 can provide a reduced distance between compressor backdisk portions and the baffle 380 close to a chocking area that can be defined in part by the tip portion 381 and in part by the compressor backdisk portions. In such an example, a reduced chocking area by itself can help to reduce leakage flow from the high pressure side to the low pressure side. Where undesirable extreme shaft motion(s) may occur, as the compressor wheels 344-1 and 344-2 are mounted to the shaft, some risk of contact with the baffle 380 may occur. However, given the shape of the baffle 380 it is likely that only a relatively small area of surfaces would touch and, due to the radius being quite small (e.g., near where the compressor wheels meet), any material that may wear off of the compressor wheels 344-1 and/or 344-2 would have a relatively low effect on wheel balance.

Figure 4:
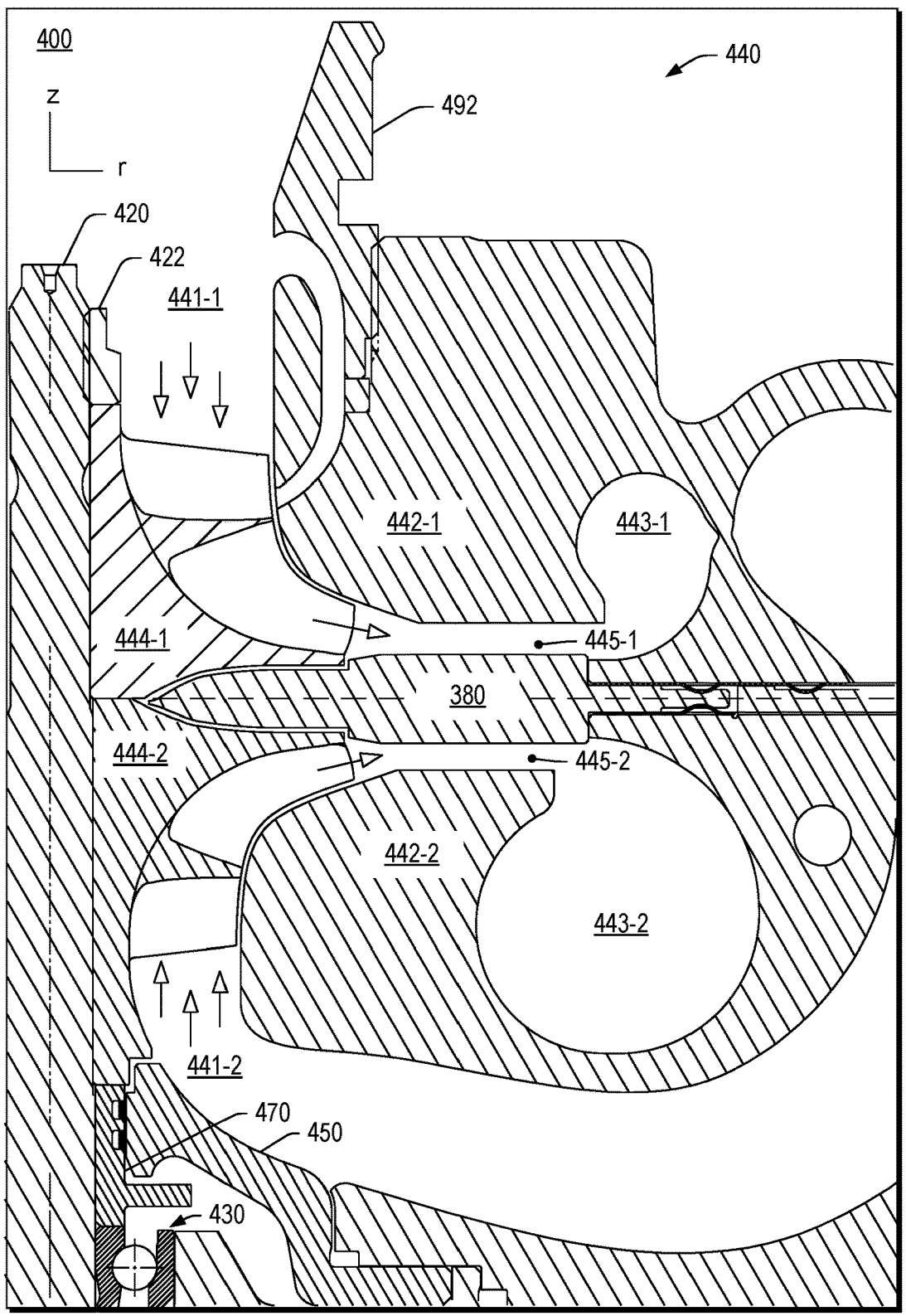
FIG. 4 is a cross-sectional view of a portion of an assembly that includes the baffle of FIG. 3.

FIG. 4 shows a cross-sectional view of a portion of an assembly 400 that includes a compressor assembly 440 operatively coupled to a component 450 of a center housing that includes a bearing assembly 430 that rotatably supports a shaft 420 to which a nut 422 axially locates a first compressor wheel 444-1 and a second compressor wheel 444-2 with respect to a collar 470. As shown, the baffle 380 is disposed in part in a space defined by a hub surface of the first compressor wheel 444-1 and a hub surface of the second compressor wheel 444-2 and the baffle 380 is disposed in part between a first compressor housing component 442-1 and a second compressor housing component 442-2.

In the example of FIG. 4, a surface of the baffle 380 forms a diffuser section 445-1 with a surface of the first compressor housing component 442-1 where the diffuser section 445-1 is in fluid communication with a volute 443-1 while another surface of the baffle 380 forms a diffuser section 445-2 with a surface of the second compressor housing component 442-2 where the diffuser section 445-2 is in fluid communication with a volute 443-2. As an example, the first and second compressor housing components 442-1 and 442-2 may be operatively coupled (e.g., clamped, etc.) to locate the baffle 380 (e.g., radially and/or axially, for example, to maintain the baffle 380 in a stationary manner with respect to the housing components 442-1 and 442-2).

In the example of FIG. 4, from a lower axial position to an upper axial position, the assembly 400 includes an inner race of the bearing assembly 430 that can contact an axial face of the collar 470 that can contact an axial end face of the second compressor wheel 444-2. As shown, an axial face at a hub end of the second compressor wheel 444-2 can contact an axial face at a hub end of the first compressor wheel 444-1 where the nut 422 (e.g., or other component) may be received by the shaft 420 to locate the compressor wheels 444-1 and 444-2 axially on the shaft 420. For example, the nut 422 may be tightened (e.g., to a torque specification) to apply a compressive force to the first and second compressor wheels 444-1 and 444-2 (e.g., with respect to the collar 470, etc.).

In the example of FIG. 4, the shaft 420 may be rotatably driven (e.g., by a turbine, an electric motor, etc.) such that, for example, air flows into the compressor assembly 440 via an opening 441-1. In the example of FIG. 4, the opening 441-1 may be defined in part by a compressor housing inlet component 492, which may form, for example, a portion of a recirculation passage (e.g., together with the first compressor housing component 442-1).

In the example of FIG. 4, the compressor assembly 440 includes two stages, a first stage (e.g., a low pressure stage) formed by the first compressor wheel 444-1, the first compressor housing component 442-1 and the baffle 380 and a second stage (e.g., a high pressure stage) formed by the second compressor wheel 444-2, the second compressor housing component 442-2 and the baffle 380. Directions of fluid flow are indicated by open headed arrows where fluid (e.g., air or air and exhaust) flows axially inwardly to an inducer portion of the first compressor wheel 444-1 and radially outwardly from an exducer portion of the first compressor wheel 444-1 to the diffuser section 445-1. Fluid in the diffuser section 445-1 then flows to the volute 443-1 and on to the inlet 441-2 to the inducer portion of the second compressor wheel 444-2. As shown, fluid flows from the inducer portion of the second compressor wheel 444-2 to an exducer portion of the second compressor wheel 444-2 and then to the diffuser section 445-2. Fluid in the diffuser section 445-2 then flows to the volute 443-2 and on to a conduit that is in fluid communication with an intake (e.g., an intake manifold) of an internal combustion engine.

Various features of the assembly 400 of FIG. 4 may be described and, for example, defined with respect to a cylindrical coordinate system. For example, consider an r, z, and Θ coordinate system where z is along an axis of rotation of the shaft 420, which may coincide with an axis of the first and second compressor housing components 442-1 and 442-2.

As an example, efficiency of the compressor assembly 440 may depend on an ability to hinder undesirable flow of fluid from the second stage to the first stage. In the example of FIG. 4, the baffle 380 and, for example, the shape of a hub surface or hub surfaces of one or both of the compressor wheels 444-1 and 444-2 may act to hinder undesirable flow of fluid from the second stage to the first stage.

FIG. 5 shows a plot 500 of results from a computational fluid dynamics (CFD) model for the baffle 380 as disposed with respect to the wheels 344-1 and 344-2 where a high pressure and a low pressure side are indicated. The contours in the plot 500 are indicated in the legend from low to high Mach number. Again, in such an example, the wheels 344-1 and 344-2 are rotating at substantial rotational speed (e.g., in excess of 100,000 rpm). As explained, the Mach number (M or Ma) is a dimensionless quantity in fluid dynamics representing the ratio of flow velocity past a boundary to the local speed of sound. As shown, the highest Mach number occurs on the low pressure side, near the tip portion 381 of the baffle 380 and proximate to the wheel 344-1. In the example of FIG. 5, the Mach numbers are in a range of approximately 0 to greater than 1, but less than 2.

In the example of FIG. 5, the Mach 1 area is located on the low pressure (LP) side as a consequence of the arranged features. As an example, an arrangement of features may aim to provide an optimized diffusor shape (e.g., profile) to achieve a Mach 1 number closest to a wheel axis where a smallest area is located to achieve a minimum leakage flow at choke. As an example, an assembly can include geometric features that are arranged to produce an aerodynamic flow blockage (e.g., choking area) as close to a shaft axis as possible (e.g., to minimize leakage area/mass flow) for particular stack-up and tolerance conditions.

Figure 6:
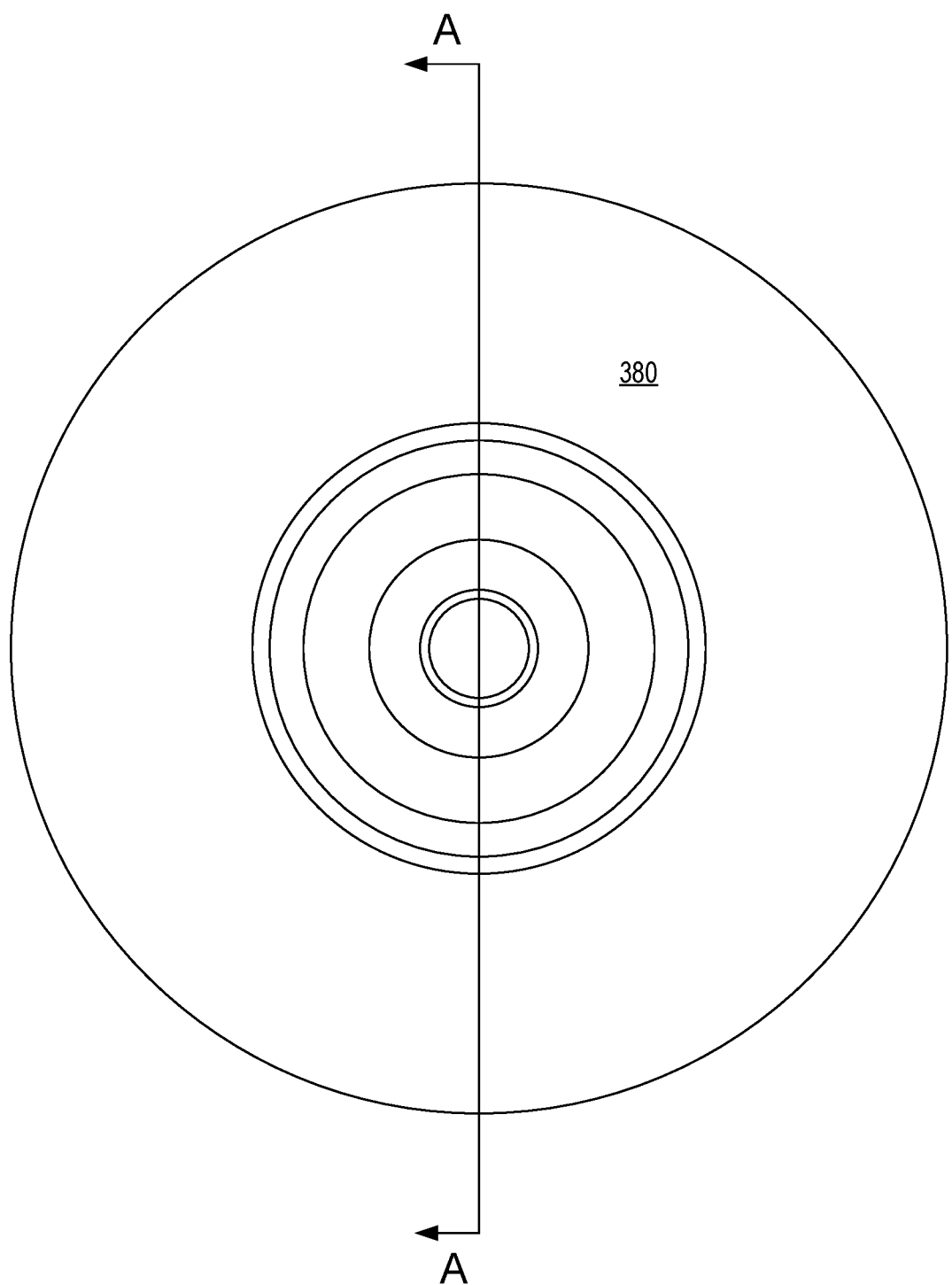
FIG. 6 is a plan view of an example of the baffle of FIG. 3.
Figure 7:
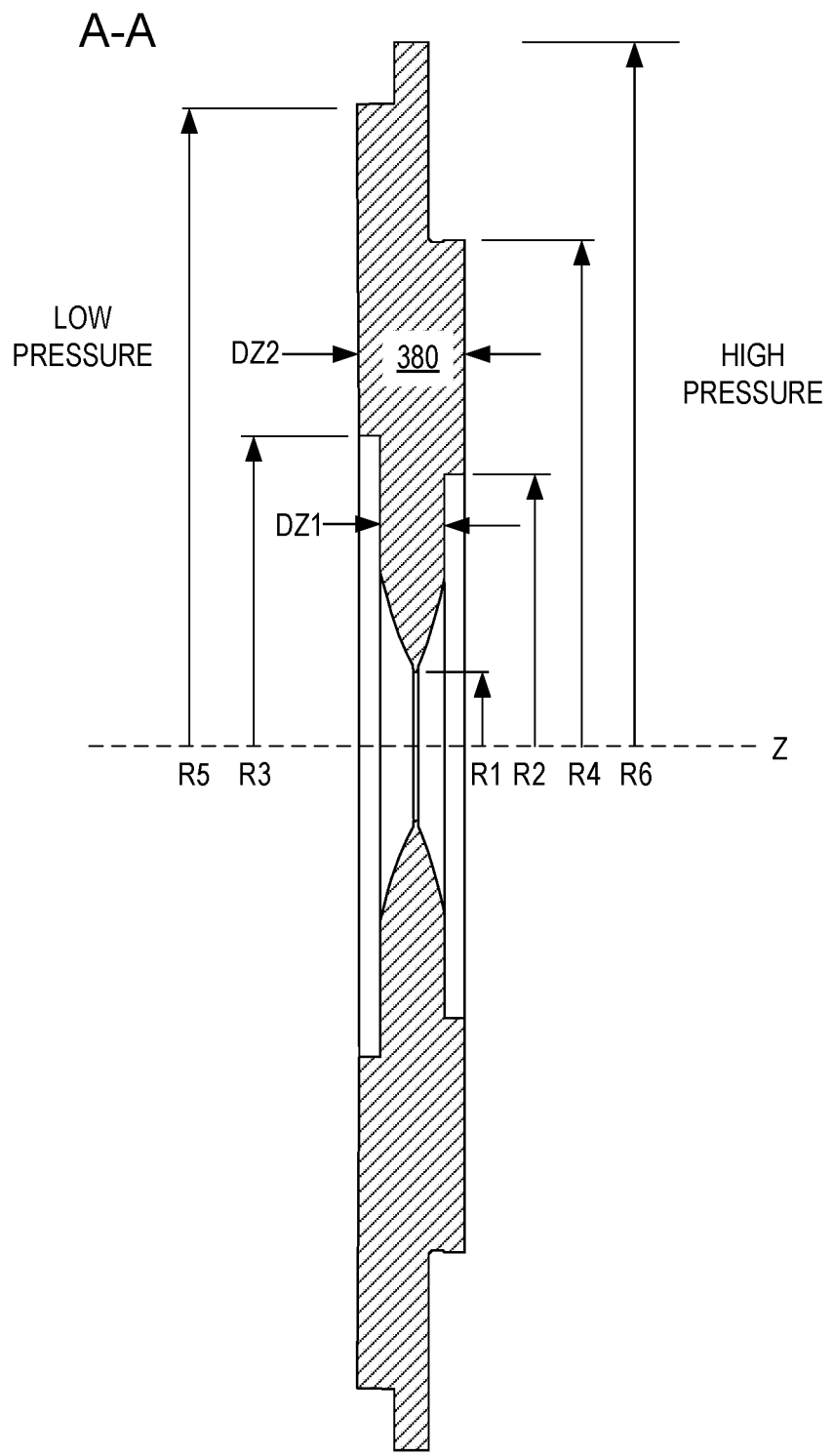
FIG. 7 is a cross-sectional view of the example of the baffle of FIG. 6 as taken along a line A-A as indicated in the plan view of FIG. 6.

FIG. 6 shows a plan view of an example of the baffle 380 along with a line A-A, for which a cross-sectional view is shown in FIG. 7. In the plan view of FIG. 6, the tip portion can be seen as being at the smallest radius or smallest diameter of the baffle 380 to form an inner perimeter of the baffle 380. An outer perimeter of the baffle 380 can be defined at the largest radius or largest diameter.

FIG. 7 shows a cross-sectional view of the baffle 380 along a centerline as indicated by the line A-A in FIG. 6. As an example, the baffle 380 can be positioned with respect to one wheel and then another wheel may be positioned such that the baffle 380 is disposed between the two wheels. As an alternative, a baffle may be a multi-piece baffle that can be installed after two wheels are brought together or, for example, where two wheels are formed from a common piece of material to be an integral, single component two faced wheel.

Various dimensions are shown in FIG. 7, including an innermost radius R1 (e.g., at an inner end, which can be a blunt end), an end of a curved portion (e.g., substantially parabolic portion) radius R2, another end of a curved portion (e.g., substantially parabolic portion) radius R3, an end of a substantially flat portion (e.g., a diffuser portion) radius R4, another end of a substantially flat portion (e.g., a diffuser portion) radius R5, and an outermost radius R6 (e.g., at an outer edge or outer end). As shown, various axial thicknesses may be defined such as the axial thickness DZ1 (e.g., of substantially parallel portions of opposing parabolic profiles of the baffle 380) and the axial thickness DZ2 (e.g., of a diffuser to diffuser portion of the baffle 380). As shown in the example of FIG. 7, the low pressure side diffuser surface may extend between radii R3 and R5 and the high pressure side diffuser surface may extend between radii R2 and R4. As indicated by the radii R2 and R3, a maximum diameter of a high pressure compressor wheel (see, e.g., R3) may be less than the maximum diameter of a low pressure compressor wheel (see, e.g., R2).

Figure 8:
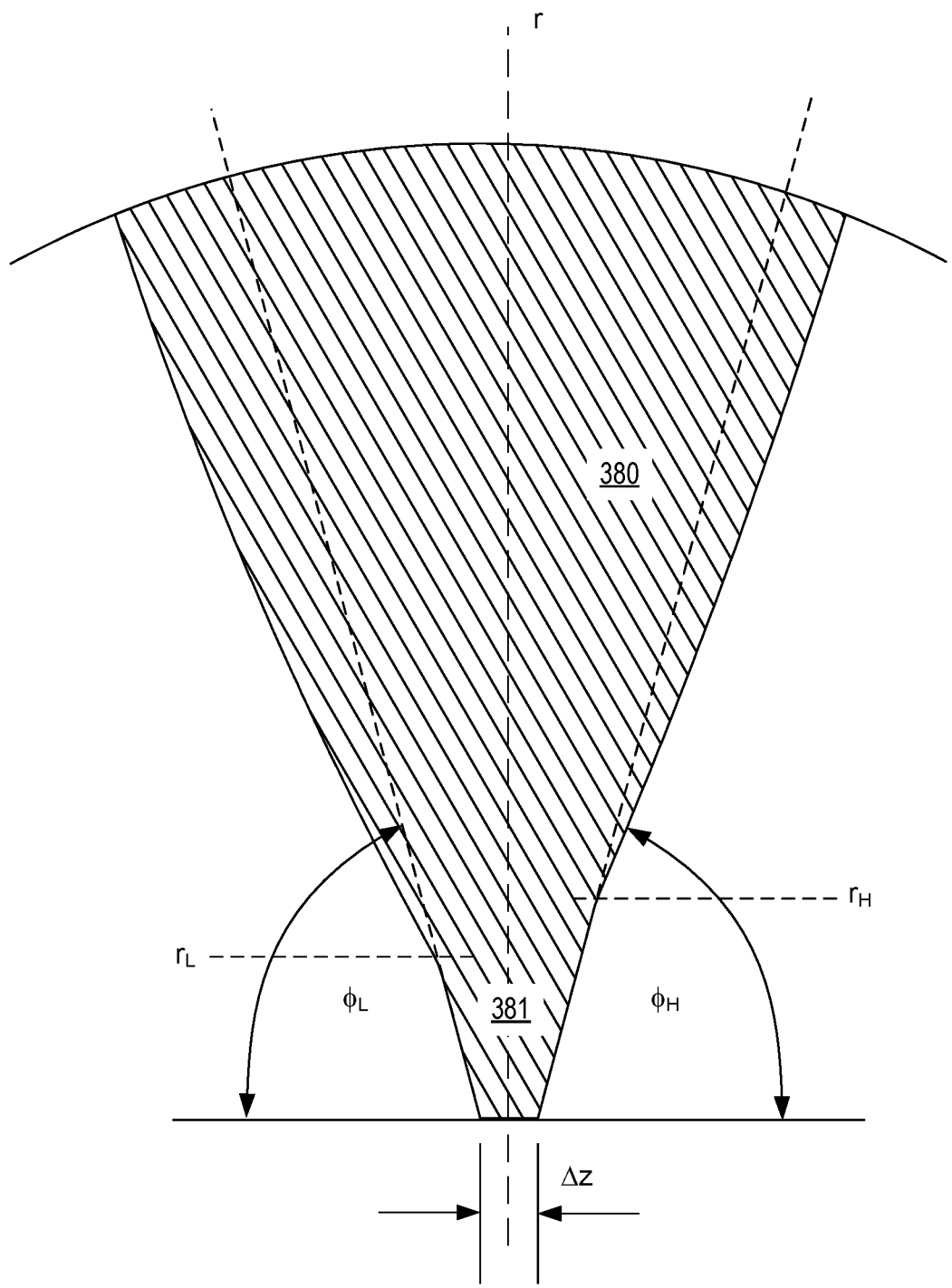
FIG. 8 is an enlarged cross-sectional view of a portion of the baffle of FIG. 3.

FIG. 8 shows a cross-sectional view of an example of a portion of the baffle 380 that includes the tip portion 381. As shown, the baffle 380 may be defined using various parameters, dimensions, angles, etc. (see, e.g., the tip portion 381 of FIG. 3). In the example of FIG. 8, angles $\phi_L$ and $\phi_H$ are shown, which may be measured with respect to an axis of rotation or a line parallel thereto. In the example of FIG. 8, the angles may be within a range of approximately 40 degrees to 85 degrees. As an example, consider a range with a lower limit of approximately 50 degrees and an upper limit of approximately 85 degrees. In the example of FIG. 8, the angles are approximately 75 degrees.

As shown in the example of FIG. 8, a low pressure side may be defined by a radius $r_L$ and a high pressure side may be defined by a radius $r_H$ where, for example, $r_H$ can be greater than $r_L$ as measured from an axis that may be a rotational axis of a wheel or wheels.

In the example of FIG. 8, the tip portion 831 may be defined by an axial span $\Delta z$. As shown, the tip portion 831 can include a blunt end. As explained, the baffle 380 can be stationary while two wheels spin such that pressure may drive a tendency of air to flow (e.g., or air and exhaust) from a high pressure side to a low pressure side.

Figure 9:
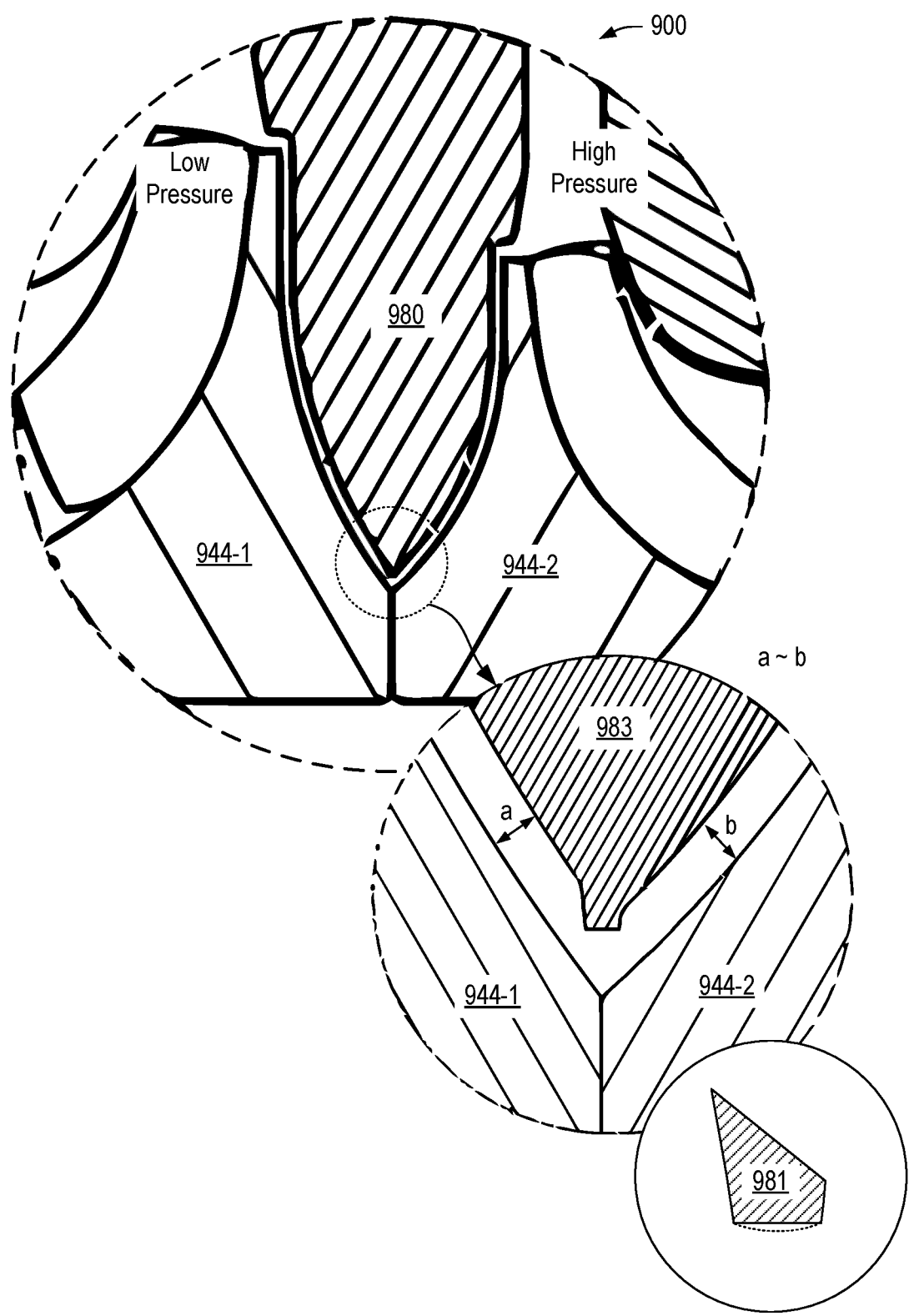
FIG. 9 is a cross-sectional view of an example of a portion of an assembly that includes an example of a baffle.

FIG. 9 shows an example of a portion of a compressor assembly 900 that includes a first compressor wheel 944-1, a second compressor wheel 944-2 and a baffle 980 that is disposed at least in part partially between a hub portion of the first compressor wheel 944-1 and a hub portion of the second compressor wheel 944-2. In the example of FIG. 9, the second compressor wheel 944-2 may be considered a high pressure stage compressor wheel while the first compressor wheel 944-1 may be considered a low pressure stage compressor wheel.

In the example of FIG. 9, the hub portions of the wheels 944-1 and 944-2 have a common outer radius such that they meet without an offset. As shown, the profiles (e.g., shapes) of the backdisk portions of the wheels 944-1 and 944-2 can differ where the baffle 980 has complementary profiles (e.g., shapes). In such an example, the clearances a and b can be within plus or minus 20 percent of one another where, for example, the clearances may become more equal within a range of operational temperatures. As an example, where the hub portions of two wheels are approximately equal (e.g., plus or minus 10 percent or less) and made of a common material (e.g., the same alloy, etc.), then a baffle may be constructed where the clearances a and b remain approximately equal (e.g., plus or minus 10 percent or less) over a range of temperatures that includes ambient and operational temperatures.

As shown in the example of FIG. 9, the baffle 980 can include some asymmetries, which, as mentioned, may be due to asymmetries between two wheels that are positioned back to back to form a low pressure stage and a high pressure stage of a multistage compressor assembly. A baffle may include one or more profile shapes, which may be defined by one or more of lines, curves, angles, etc.

As shown in FIG. 9, the annular baffle 980 can be for a two stage radial compressor assembly where the annular baffle can include an outer edge (e.g., an outer end); and a substantially parabolic portion 983 that extends to a tip portion 981, wherein the tip portion 981 includes opposing sides that converge radially inwardly to a blunt end. As shown, a blunt end may be defined by a relatively flat surface that can be an annular surface that defines an inner perimeter of an annular baffle. As explained, the blunt end may be slightly curved (see, e.g., dotted line) between corners (e.g., sharp and/or radiused).

As explained, a tip portion of a baffle can be defined in part via a low pressure side transition region and a high pressure side transition region where a change in curvature may occur such as, for example, a change from a curved surface (e.g., a curved portion that may be a substantially parabolic portion) to a less curved surface, which may be a straight surface (e.g., a flat surface). As explained, a tip portion can include opposing surfaces that converge to a blunt end.

As to a blunt end, consider a wedge as a tool that can function by converting a force applied to its blunt end into forces perpendicular (e.g., normal) to its inclined surfaces, which meet at a sharp tip or apex. As explained, a tip portion of an annular baffle can include opposing sides that extend to a blunt end where the opposing sides may converge to the blunt end at an angle of 90 degrees or less (e.g., less than 91 degrees) and greater than approximately 50 degrees.

Figure 10:
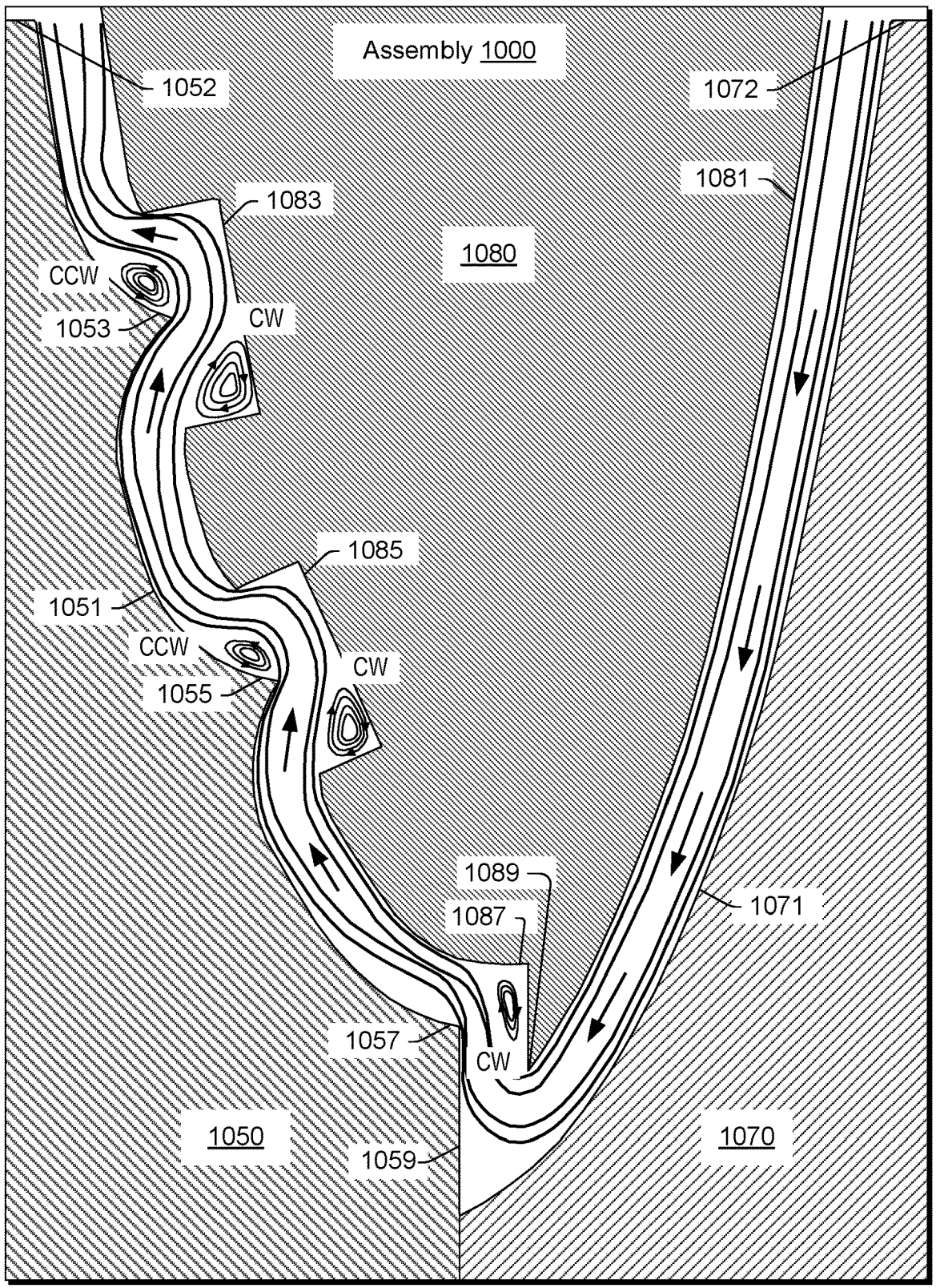
FIG. 10 is a cross-sectional view of a portion of the assembly that illustrates flow in a passage defined in part by a baffle.

FIG. 10 shows examples of approximate streamlines of fluid in the passage formed at least in part by a different baffle, baffle 1080 as part of an example of an assembly 1000 that includes a compressor wheel 1050 and a compressor wheel 1070. As shown in the example assembly 1000, the compressor wheel 1050 includes a hub portion with a surface 1051 that includes a first annular cusp 1053, a second annular cusp 1055, an annular corner 1057 and an annular face 1059 and the compressor wheel 1070 includes a hub portion with a surface 1071. As shown, the baffle 1080 includes a side 1081 that extends to a tip 1089 where an opposing side includes annular channels 1083 and 1085 and an annular notch 1087.

As an example, an annular cusp may be a feature formed by two annular curved surfaces that meet. As an example, an annular cusp may include a maximum defined by an annular line or, for example, by an annular surface. As an example, a hub surface of a compressor wheel may include a feature that extends outwardly away from the hub surface where such a feature may be, in cross-section, for example, a cusp. As an example, a feature of a hub surface of a compressor wheel may be a ridge. As an example, an annular cusp may be a ridge. As an example, a ridge may be formed in part by one or more curved surfaces.

As shown in FIG. 10, for a given overall direction of flow (see large arrows), annular eddies are formed, which can include one or more clockwise rotating eddies and one or more counter-clockwise rotating eddies. For example, three clockwise (CW) rotating eddies are shown and two counter-clockwise (CCW) rotating eddies are shown.

In the example of FIG. 10, the streamlines and eddies are approximate as flow between a stationary surface (e.g., of the baffle 1080) and rotating surfaces (e.g., of the compressor wheels 1050 and 1070) may form Couette types of flows as may exist between parallel plates, one of which is moving relative to the other. Further, such flow may be turbulent given the rotational speed of the compressor wheels 1050 and 1070 may be of the order of tens of thousands of revolutions per minute (rpm) and as much as 100,000 rpm or more. Thus, flow may be complex and include pressure driven flow (e.g., as a driving force from a high pressure region to a low pressure region) and Couette type of flow, which may be turbulent (e.g., noting that the term "Couette type" is to indicate that flow may or may not be laminar).

As an example, a baffle can include one or more annular channels. As an example, a hub surface of a compressor wheel can include one or more annular features such as, for example, one or more annular cusps. As an example, an assembly can include a baffle with a single annular channel and a compressor wheel that includes a single annular cusp (see, e.g., the channel 1083 and the cusp 1053 or the channel 1085 and the cusp 1055). In such an example, the baffle may include a notch (see, e.g., the notch 1087). As an example, an assembly can include a baffle with one or more annular channels and a compressor wheel that includes one or more annular cusps (see, e.g., the channel 1083 and the cusp 1053 and/or the channel 1085 and the cusp 1055). In such an example, the baffle may include a notch (see, e.g., the notch 1087).

FIG. 11 shows an example table 1100 with a comparison of values for the baffle 380 of FIG. 3 and the baffle 1080 of FIG. 10. As shown, while both can reduce leakage and provide acceptable efficiency, the baffle 380 provides improved efficiency (greater efficiency) and/or improved leakage (less leakage) compared to the baffle 1080. In the examples of FIG. 3 and FIG. 10, the baffle 380 has fewer features and the base portions of the wheels 344-1 and 344-2 have fewer features compared to the baffle 1080 and the base portions of the wheels 1050 and 1070. As such, the baffle 380 is simpler to manufacture and the wheels 344-1 and 344-2 are simpler to manufacture. As shown in the table 1100, efficiency is improved for the baffle 380 with respect to the baffle 1080 (64.96 versus 64.88) and mass flow leakage is reduced (3.3 g/s versus 3.6 g/s).

Baffles with other shapes were also tested. For example, a baffle with a sharp pointed end formed by converging parabolic profiles exhibited lower efficiency (64.81) and greater leakage (3.9 g/s) than the baffle 380 and such a baffle with the sharp pointed end cut off exhibited lower efficiency (64.87) and greater leakage (4.1 g/s) than the baffle 380. As explained, a tip portion that may be defined via change in concavity and including a blunt end can increase efficiency and lower mass flow leakage at least in part via vortex formation with a vortex offset to the low pressure side that can provide a Mach number maximum. While such a tip portion may form one or more other vortices, a vortex with a Mach number maximum can be formed offset to the low pressure side to at least reduce mass flow leakage.

As an example, interstage leakage may act to decrease overall compressor stage efficiency. As an example, an assembly that includes an annular baffle that includes one or more features such as one or more of those of the baffle 380 of FIG. 3 may act to reduce interstage leakage between compressor stages.

As an example, a turbocharger can include multi-stage compressor with a high pressure (HP) stage and a low pressure (LP) stage and can include a baffle where the baffle may act to define a space with respect to a HP stage wheel and a LP stage wheel where the baffle can act to reduce leakage via the space. In such an example, one or more of the wheels may include one or more features that may act to, in part, define the space and to reduce leakage via the space.

As an example, a multi-stage compressor may include one or more variable diffuser mechanisms that can, for example, alter geometry of a diffuser section. As an example, a turbocharger may include a variable geometry turbine assembly that may include, for example, adjustable vanes (e.g., that can alter throat size, shape, etc.). As an example, a turbocharger may include a variable geometry multi-stage compressor assembly and a variable geometry turbine assembly.

As an example, a hub surface of a compressor wheel may be shaped in a manner that can accommodate stresses. As mentioned, a compressor wheel may rotate at speeds in excess of 100,000 revolutions per minute. At such speeds, the compressor wheel can experience considerable stress. In an effort to avoid wheel burst (e.g., blade and/or hub), various portions of a compressor wheel may be shaped in manners that can accommodate stresses. One type of burst is blade burst, which occurs when the centrifugal force at speed acting to pull the blades off of the central hub overcomes the mechanical strength of the root sections connecting the individual blades to the hub. Under such conditions, if a blade root is too weak, it could detach from the hub. Another type of burst is hub burst, which occurs when the hub to which the blades are attached reaches a strength limit and, for example, breaks into two, three or more pieces (e.g., through the centerline of the wheel). As an example, a hub may be formed as a continuous mass where, upon rotation, internal stresses are maximal at the hub's core (e.g., portion that forms a bore). A lower hub surface may be shaped from a core portion to an end to provide for core mass and less mass at the end.

A shape of a hub surface may be curved in a manner that can accommodate stress. As an example, a shape of a hub surface of a compressor wheel may be, in cross-section, a shape of half a parabola (e.g., a parabolic shape). As an example, a baffle may be shaped with a surface that matches at least a portion of a hub surface of a compressor wheel. In such an example, a relatively constant axial clearance may exist with respect to radial distance between the baffle and the compressor wheel.

As an example, a baffle may be formed of a material such as steel. As an example, a baffle may be formed of an alloy.

As an example, a baffle may be coated with a coating. As an example, a coating may resist chemical attack of a baffle core material. For example, consider a multistage compressor assembly implemented in a system that can include exhaust gas recirculation (EGR). In such an example, a coating may resist chemical attack by one or more components in exhaust gas of an internal combustion engine (e.g., which may react with one or more components in intake air, etc.).

As an example, a multistage compressor assembly may include compressors wheels made of the same material or compressor wheels made of different materials. As an example, a compressor wheel may be made of aluminum or an aluminum-base alloy.

As explained, reduced distance between compressor backdisk portions and a baffle can be provided close to a chocking area such that the reduced chocking area acts to reduce the leakage flow. As an example, a baffle such as the baffle 380 may provide clearances in regions where, in case of extreme shaft motion, only a small area of surfaces may be touching. Such an approach can help to reduce energy losses. With reduced surface for touching (e.g., due to small diameter, etc.), any resulting material wear off can be expected to have a relatively low effect on wheel balance.

As explained, an example baffle can reduce leakage mass flow between LP and HP compressor stages, which can have a beneficial effect on efficiency and shaft power increment. CFD results show that the example baffle 380 reduced mass flow more than the more complex baffle 1080, which also involves a more complex compressor backdisk. In comparing the baffles 380 and 1080, the profile of the baffle 380 is simpler and provides for ease of manufacture.

As an example, an annular baffle for a two stage radial compressor assembly can include an outer edge; and a substantially parabolic portion that extends to a tip portion, where the tip portion includes opposing sides that converge radially inwardly to a blunt end. In such an example, the tip portion can include a quadrilateral cross-section. For example, consider a quadrilateral cross-section that is convex.

As an example, a tip portion of an annular baffle can have a convex cross-section. In such an example, the tip portion can be adjacent a substantially parabolic portion. As an example, a tip portion may be defined at least in part by a change in concavity.

As an example, a tip portion of an annular baffle can include a blunt end with a length that is less than a length of at least one of opposing sides of a quadrilateral cross-section of the tip portion.

As an example, an annular baffle can include a tip portion that can be defined by a polygonal cross-section that is convex. For example, consider a quadrilateral cross-section that is convex and includes one acute angle and three obtuse angles.

As an example, a tip portion of a baffle can include opposing sides where one is a longer side and the other is a shorter side. In such an example, back-to-back compressor wheels may be of different sizes and/or shapes where the difference in lengths of the opposing sides of the tip portion of the baffle accommodates the different sizes and/or shapes of the compressor wheels (e.g., backdisk portions of the compressor wheels, etc.).

As an example, at least one of opposing sides of a tip portion of a baffle may converge to a blunt end at an angle that is less than or equal to 90 degrees and greater than 50 degrees.

As an example, a blunt end of a tip portion of an annular baffle can define an inner perimeter of the annular baffle. In such an example, the tip portion can be a closest portion of the annular baffle to a rotational axis of a back-to-back compressor wheels. As an example, where a compressor wheel includes two faces and is formed as a unitary component, an annular baffle may be separable (e.g., a split baffle) such that it can be positioned between backdisk portions of the compressor wheel.

As explained, an annular baffle can include a transition region between a substantially parabolic portion and a tip portion. In such an example, the transition region can include opposing transition features. For example, consider a low pressure side transition feature and a high pressure side transition feature. As explained, concavity may change in a transition region, which may be represented mathematically (e.g., in terms of inflection, in terms of continuity, etc.).

As an example, a backdisk of a compressor wheel can include a substantially parabolic profile where the substantially parabolic profile aims to reduce operational stress. For example, a hub of a compressor wheel can include a hub surface that transitions from a flat end to a backdisk portion with a profile that aims to achieve desirable stress behavior. In such an example, the profile may be defined using a parabolic equation. As explained, a compressor wheel can include a bore, which may be a through bore. During operation, as the compressor wheel rotates, various stresses can be experienced. Stress can originate from the material itself (e.g., a compressor wheel's own mass), can originate from blades (e.g., interactions with air, etc.), can originate from clamping (e.g., axial clamping via a nut, etc.), etc. One or more types of analyses may be performed to optimize a compressor wheel as to its stress behavior (e.g., consider finite element analysis (FEA), etc.).

As an example, a backdisk portion of a first compressor wheel may be represented by a semi-parabola or a portion thereof and a backdisk portion of a second compressor wheel may be represented by a semi-parabola or a portion thereof. In such an example, the two semi-parabolas may join at an apex where the apex does not have continuity greater than $C^0$ continuity. As an example, backdisk portions may be machined to provide a joint or interface where continuity may be greater than $C^0$ continuity. As an example, backdisk portions may be machined such that a single parabola may represent a space defined by the backdisk portions when aligned back-to-back. As explained, in various instances, backdisk portions will meet at a meeting point that lacks continuity greater than $C^0$ continuity such that an annular baffle can include a tip portion that extends toward the meeting point (e.g., at operational temperatures). In such an approach, the tip portion may help to choke off flow from a high pressure side to a low pressure side.

As an example, an assembly can include a first radial compressor wheel that has a rotational axis and that includes a hub surface; a second radial compressor wheel that includes a hub surface; and an annular baffle disposed at least in part between the hub surfaces where the annular baffle includes an outer edge and a substantially parabolic portion that extends to a tip portion, where the tip portion includes opposing sides that converge radially inwardly to a blunt end. In such an example, the first radial compressor wheel can include an axial face defined by a first diameter and the second radial compressor wheel can include an axial face defined by a second diameter where the first diameter exceeds the second diameter.

As an example, a first radial compressor wheel can be a low pressure stage compressor wheel and a second radial compressor wheel can be a high pressure stage compressor wheel. In such an example, the first radial compressor wheel and the second radial compressor wheel can define an annular inset space.

As an example, a tip portion of an annular baffle can be offset axially toward a high pressure stage compressor wheel, for example, at ambient temperature. In such an example, at operational temperatures, due to heat energy, the tip portion may become more centered between low and high pressure stages. As an example, where two back-to-back compressor wheels differ in material, shape and/or size, their thermal behaviors may differ. As an example, two back-to-back compressor wheels may be in different operational environments. For example, low and high pressure stages may differ in terms of temperature; noting that heat transfer may occur between such wheels where they are in contact. As an example, one or more thermal effects that occur during operation may be accounted for by providing an annular baffle that may differ in its relative position at ambient and operational temperatures.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An annular baffle configured to a two stage radial compressor assembly, the annular baffle comprising:
   an outer edge; and
   a substantially parabolic portion that extends to a tip portion, wherein:
   the tip portion comprises a bluff body having opposing sides that converge radially inwardly to a blunt end, the opposing sides lacking an annular notch;
   wherein the opposing sides comprise a low pressure side complementary to a shape of a backdisk portion of a low pressure radial compressor wheel of a first stage of the two stage radial compressor assembly and a high pressure side complementary to a shape of a backdisk portion of a high pressure radial compressor wheel of a second stage of the two stage radial compressor assembly; and
   wherein at least one of the parabolic portion and the tip portion is configured to reduce interstage leakage; and
   wherein absence of the annular notch contributes to reduction in the interstage leakage.

2. The annular baffle according to claim 1, wherein the tip portion comprises a quadrilateral cross-section.

3. The annular baffle according to claim 2, wherein the quadrilateral cross-section is convex.

4. The annular baffle according to claim 2, wherein the blunt end comprises a length that is less than a length of at least one of the opposing sides.

5. The annular baffle according to claim 2, wherein the quadrilateral cross-section comprises one acute angle and three obtuse angles.

6. The annular baffle according to claim 1, wherein the baffle is asymmetrical such that opposing sides comprise a longer side and a shorter side.

7. The annular baffle according to claim 1, wherein at least one of the opposing sides of the tip portion converges to the blunt end at an angle less than or equal to 90 degrees and greater than 50 degrees.

8. The annular baffle according to claim 1, wherein the blunt end defines an inner perimeter of the annular baffle.

9. The annular baffle according to claim 1, comprising a transition region between the substantially parabolic portion and the tip portion.

10. The annular baffle according to claim 9, wherein the transition region comprises opposing transition features.

11. The assembly according to claim 1, wherein the baffle is arranged offset with respect to low pressure radial compressor wheel and the high pressure radial compressor wheel and the baffle is configured to migrate towards a central position between the low pressure radial compressor wheel and the high pressure radial compressor wheel in response to an increase in operating temperature.

12. The assembly according to claim 1, wherein the baffle is further configured to promote at least one vortex between the lower pressure side and the backdisk portion of the low pressure radial compressor wheel.

13. An assembly comprising:
   a first radial compressor wheel that has a rotational axis and that comprises a hub surface;
   a second radial compressor wheel that comprises a hub surface; and
   an annular baffle disposed at least in part in a space defined between the hub surfaces wherein the annular baffle comprises an outer edge, opposing diffuser surfaces for flow to respective volutes, and a substantially parabolic portion that extends to a tip portion,
   wherein the tip portion comprises a bluff body including opposing sides that converge radially inwardly to a blunt end and lack an annual notch,
   wherein the baffle is configured to reduce interstage leakage; and
   wherein absence of the annular notch contributes to reduction in the interstage leakage.

14. The assembly according to claim 13 wherein the first radial compressor wheel comprises an axial face defined by a first diameter and wherein the second radial compressor wheel comprises an axial face defined by a second diameter wherein the first diameter exceeds the second diameter.

15. The assembly according to claim 14, wherein the first radial compressor wheel is a low pressure stage compressor wheel, wherein the second radial compressor wheel is a high pressure stage compressor wheel, and wherein the opposing diffuser surfaces comprise a low pressure stage diffuser surface and a high pressure stage diffuser surface.

16. The assembly according to claim 15, wherein the tip portion of the annular baffle is offset axially toward the high pressure stage compressor wheel.

17. The assembly according to claim 13, wherein the baffle is asymmetrical.

18. The assembly according to claim 13, wherein the baffle is arranged offset with respect to low pressure radial compressor wheel and the high pressure radial compressor wheel and the baffle is configured to migrate towards a central position between the low pressure radial compressor wheel and the high pressure radial compressor wheel in response to an increase in operating temperature.

19. The assembly according to claim 13, wherein the baffle is further configured to promote at least one vortex between the lower pressure side and the backdisk portion of the low pressure radial compressor wheel.

* * * * *